United States Patent
Amano et al.

(10) Patent No.: US 7,488,183 B2
(45) Date of Patent: Feb. 10, 2009

(54) DATA STORAGE DEVICE AND CONNECTOR DISPOSED THEREIN

(75) Inventors: Yoshiroh Amano, Kanagawa (JP); Kohji Takahashi, Kanagawa (JP); Naoyuki Yamazaki, Kanagawa (JP); Shigeru Ohyama, Kanagawa (JP); Sumio Obata, Kangawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 0 days.

(21) Appl. No.: 11/603,350

(22) Filed: Nov. 20, 2006

(65) Prior Publication Data

US 2007/0128894 A1   Jun. 7, 2007

(30) Foreign Application Priority Data

Nov. 25, 2005   (JP) .............................. 2005-340306

(51) Int. Cl.
*H01R 12/00* (2006.01)

(52) U.S. Cl. ......................................................... 439/74

(58) Field of Classification Search ................ 439/76.1, 439/377, 157, 926, 79–80, 354, 552, 557–558, 439/357, 74

See application file for complete search history.

(56) References Cited

U.S. PATENT DOCUMENTS

| | | | | |
|---|---|---|---|---|
| 4,541,036 A | * | 9/1985 | Landries et al. | ............. 361/823 |
| 5,514,000 A | * | 5/1996 | Krause et al. | ............... 439/248 |
| 5,800,208 A | * | 9/1998 | Ishizuka et al. | ............. 439/557 |
| 6,547,591 B2 | | 4/2003 | Okabe et al. | |

FOREIGN PATENT DOCUMENTS

JP   2001-283958   10/2001

* cited by examiner

*Primary Examiner*—Edwin A. Leon
(74) *Attorney, Agent, or Firm*—Townsend and Townsend and Crew LLP; John Henkhaus

(57) ABSTRACT

Embodiments in accordance with the present invention provide a connector for a data storage device having a sufficient strength, and relate to a data storage device using such a connector. In accordance with one embodiment, a data storage device is provided having a circuit board and a connector for making a connection with an external interface. The connector includes bosses disposed on both sides across a center of a direction orthogonal to a direction perpendicular to a main surface of the circuit board and a direction, in which the connector is connected to the interface. The boss is a protrusion that counteracts a force applied to the connector by being embedded in a hole disposed in the circuit board when the connector is disposed in the circuit board. The boss has an oblong shape having a length in a direction, in which the interface and the connector are connected together, longer than a length in a direction orthogonal to a direction perpendicular to a main surface of the circuit board and a direction, in which the connector is connected to the interface. The boss protrudes in the direction perpendicular to the main surface of the circuit board.

9 Claims, 4 Drawing Sheets

DATA STORAGE DEVICE AND CONNECTOR DISPOSED THEREIN

CROSS-REFERENCE TO RELATED APPLICATION

The instant nonprovisional patent application claims priority to Japanese Patent Application No. 2005-340306, filed Nov. 25, 2006 and incorporated by reference herein in its entirety for all purposes.

BACKGROUND OF THE INVENTION

The present invention relates generally to a data storage device and a connector disposed therein. More specifically, the present invention relates to a connector that includes a lock portion capable of reducing stress placed on a circuit board when a connector connection is made, and a data storage device having such a connector disposed therein.

Data storage devices, which use various forms of media such as an optical disk and magnetic tape, are known. Among these data storage devices, a hard disk drive (hereinafter referred to as "HDD") is widely popular as a computer storage device, serving as a storage device indispensable to present-day computer systems. Thanks to its outstanding characteristics, the HDD is expanding its application areas covering not only computers, but also moving picture recording and reproducing apparatuses, car navigation systems, cellular phones, and removable memories used in digital cameras.

In line with the needs in the foregoing application areas, even later developments include HDDs having several different sizes and shapes. This has also resulted in development of connectors disposed in the HDD having several different shapes. In particular, a 2.5" HDD is used in notebook PCs and the like. Because of restrictions imposed on weight and associated reasons, the connector is formed from a resin, not a metal.

FIGS. 4(a) and 4(b) are cross-sectional views showing schematically a connector 90 that has been developed for intended applications in the aforementioned areas. FIG. 4(a) is a cross-sectional view showing a condition, in which the connector 90 and a circuit board inside an HDD main body are connected together, as viewed from a direction opposite to the circuit board. FIG. 4(b) is a cross-sectional view showing the connector 90 as viewed from a direction perpendicular to a protruding direction of pins 91 and a longitudinal direction of the connector 90. The connector 90 is disposed in the circuit board inside the HDD main body. The connector 90 includes the pins 91 and connection terminals 92 corresponding respectively to the pins 91. When the connector 90 is connected to an external interface of the HDD, an electric connection is made between the pins 91 and terminals of the external interface of the HDD. This allows signals to be exchanged. Further, the connection terminals 92 are connected to the circuit board inside the HDD main body through soldering or the like such that current can flow. Electric signals inputted and outputted through the connector 90 are thereby exchanged.

The connector 90 further includes a positioning protrusion 93 and a latch 94 provided for positioning the connector 90 as the connector 90 is mounted to the circuit board. Generally, the positioning protrusion 93 is disposed on an end portion of the connector 90 and the latch 94 is disposed at a central portion of the connector 90. Further, the positioning protrusion 93 is generally disposed at a part of a base portion of the connector 90. This part is protruded in a direction opposite to the protruding direction of the pins 91.

Mounting of the connector 90 to the circuit board is accomplished as follows. Specifically, when the connector 90 is mounted to the circuit board, a hole is made in a portion of the circuit board corresponding to the position of the positioning protrusion 93. The positioning protrusion 93 is then fitted into this hole, which positions the connector 90 correctly. Further, when the connector 90 is mounted to the circuit board, the latch 94 is designed to be hooked onto the circuit board. In a manner as described above, the connector 90 is correctly positioned relative to the circuit board.

The connector 90 further includes a lock portion 95. The lock portion 95 prevents the connector 90 from being disconnected from the circuit board or both the circuit board and the connector 90 from coming off together, which could occur during removal or when the HDD is dropped from the connector 90 side down. The lock portion 95 included in the connector 90 allows stress that would be placed on the circuit board when the connector is connected to be reduced. See, for example Japanese Patent Laid-open No. 2001-283958.

There is, however, a concern that the connection made through soldering or the like between the connector, which includes the lock portion 95 for reducing stress, and the circuit board may be destroyed when the connection is made randomly or the data storage device is dropped. This invention has been made to solve the problem. It is desirable to provide a connector for a data storage device having a sufficient strength for making a connector connection, and a data storage device using such a connector.

BRIEF SUMMARY OF THE INVENTION

Embodiments in accordance with the present invention provide a connector for a data storage device having a sufficient strength, and relate to a data storage device using such a connector. With reference to the embodiment shown in FIGS. 3(a)-(b), a data storage device is provided having a circuit board 15 and a connector 20 for making a connection with an external interface. The connector 20 includes bosses 231 disposed on both sides across a center of a direction orthogonal to a direction perpendicular to a main surface of the circuit board 15 and a direction, in which the connector 20 is connected to the interface. The boss 231 is a protrusion that counteracts a force applied to the connector 20 by being embedded in a hole disposed in the circuit board 15 when the connector 20 is disposed in the circuit board 15. The boss 231 has an oblong shape having a length in a direction, in which the interface and the connector 20 are connected together, longer than a length in a direction orthogonal to a direction perpendicular to a main surface of the circuit board 15 and a direction, in which the connector 20 is connected to the interface. The boss 231 protrudes in the direction perpendicular to the main surface of the circuit board 15.

In accordance with embodiments of the present invention, a data storage device is provided having a circuit board and a connector for making a connection with an external interface. The connector includes bosses disposed on both sides across a center of a direction orthogonal to a direction perpendicular to a main surface of the circuit board and a direction, in which the connector is connected to the interface. The boss is a protrusion that counteracts a force applied to the connector by being embedded in a hole disposed in the circuit board when the connector is disposed in the circuit board.

A data storage device according one embodiment of the present invention includes a circuit board and a connector connecting to an external interface. The connector includes bosses disposed on both sides across a center of a direction orthogonal to a direction perpendicular to a main surface of the circuit board and a direction, in which the connector is connected to the interface. The boss is a protrusion that counteracts a force applied to the connector by being embedded in a hole disposed in the circuit board when the connector is disposed in the circuit board. The boss has an oblong shape having a length in the direction, in which the connector and the interface are connected together, longer than a length in a direction orthogonal to the direction perpendicular to the main surface of the circuit board and the direction, in which the connector is connected to the interface. The boss protrudes in the direction perpendicular to the main surface of the circuit board. By using the connector including the bosses as described above, it is possible to provide a data storage device including an HDD connector that offers a sufficient strength when the connector connection is made.

In one embodiment of the present invention, the connector includes a latch for defining a positional relation between the circuit board and the connector. The latch helps define the positional relation between the circuit board and the connector. The connector may further include a protrusion that fits into a hole formed in the circuit board when the circuit board is connected to the connector, thereby defining the positional relation with the connector. Furthermore, the bosses may be disposed on sides closer to the ends of the connector than the latch and positioning protrusion. Disposing the bosses on the ends of the connector outer than the latch and positioning protrusion results in the end portions becoming unable to counteract the force applied to the connector. Accordingly, concern about broken end portions can be eliminated. Further, the protrusion may be disposed at a position offset from the latch in the direction in which the interface and the connector are connected together. This arrangement allows the positional relation between the circuit board and the connector in all directions to be reliably defined.

A data storage device according another embodiment of the present invention includes a circuit board and a connector connecting to an external interface. The connector includes stoppers disposed on both sides across a center of a direction orthogonal to a direction perpendicular to a main surface of the circuit board and a direction, in which the connector is connected to the interface. Each of the stoppers is a protrusion that counteracts a force applied to the connector. The stopper protrudes in the direction perpendicular to the main surface of the circuit board. The connector may include bosses disposed on both sides across a center of the direction orthogonal to the direction perpendicular to the main surface of the circuit board and the direction, in which the connector is connected to the interface. The boss may be a protrusion that counteracts a force applied to the connector by being embedded in a hole disposed in the circuit board when the connector is disposed in the circuit board. The boss may further include an oblong shape having a length in the direction, in which the connector and the interface are connected together, longer than a length in the direction orthogonal to the direction perpendicular to the main surface of the circuit board and the direction, in which the connector is connected to the interface. In some embodiments, the boss protrudes in the direction perpendicular to the main surface of the circuit board. The arrangement, in which the connector includes both the bosses and positioning protrusions, helps augment the force applied to the connector that can be counteracted.

A connector for a data storage device according to still another embodiment of the present invention is intended for connecting a data storage device having a circuit board and an external interface of the data storage device. The connector includes bosses disposed on both sides across a center of a direction orthogonal to a direction perpendicular to a main surface of the circuit board and a direction, in which the connector is connected to the interface. The boss is a protrusion that counteracts a force applied to the connector by being embedded in a hole disposed in the circuit board when the connector is disposed in the circuit board. The boss has an oblong shape having a length in the direction, in which the connector and the interface are connected together, longer than a length in a direction orthogonal to the direction perpendicular to the main surface of the circuit board and the direction, in which the connector is connected to the interface. The boss protrudes in the direction perpendicular to the main surface of the circuit board.

With the connector for the data storage device according to an embodiment of the present invention, it is possible to reduce the possibility that the connection between the circuit board disposed inside the data storage device and the connector will be destroyed, even though a large force is applied when the interface connector of the data storage device is connected or the data storage device is dropped. Accordingly, it is possible to provide a connector for a data storage device having a sufficient strength for making a connector connection and a data storage device that uses such a connector.

DETAILED DESCRIPTION OF THE INVENTION

Embodiments of the present invention will be described below with reference to the accompanying drawings. The embodiments represent a connector for a data storage device, to which the present invention is applied. The connector for the data storage device according to an embodiment of the present invention includes a lock portion that can reduce stress placed on a circuit board when a connector connection is made. In the description that follows, an HDD is used as an example of the data storage device.

Figure 1:
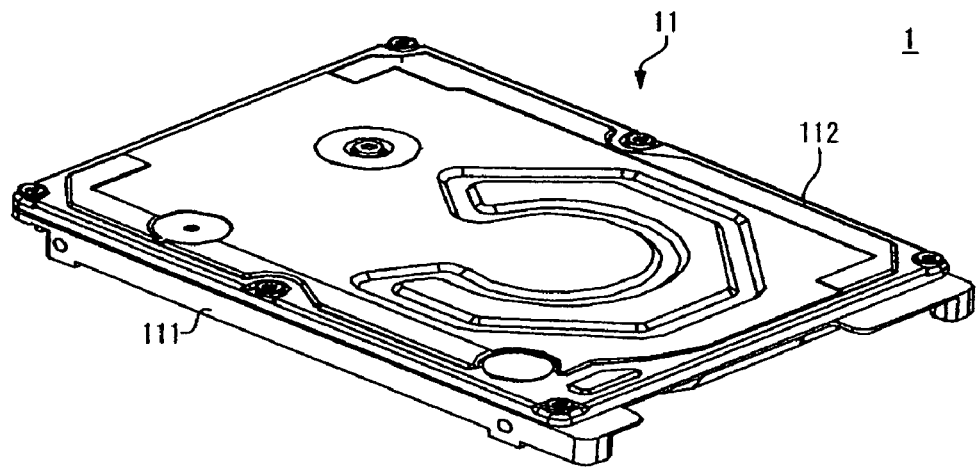
FIG. 1 is a plan view showing schematically an internal arrangement of an HDD main body 11.
Figure 1:
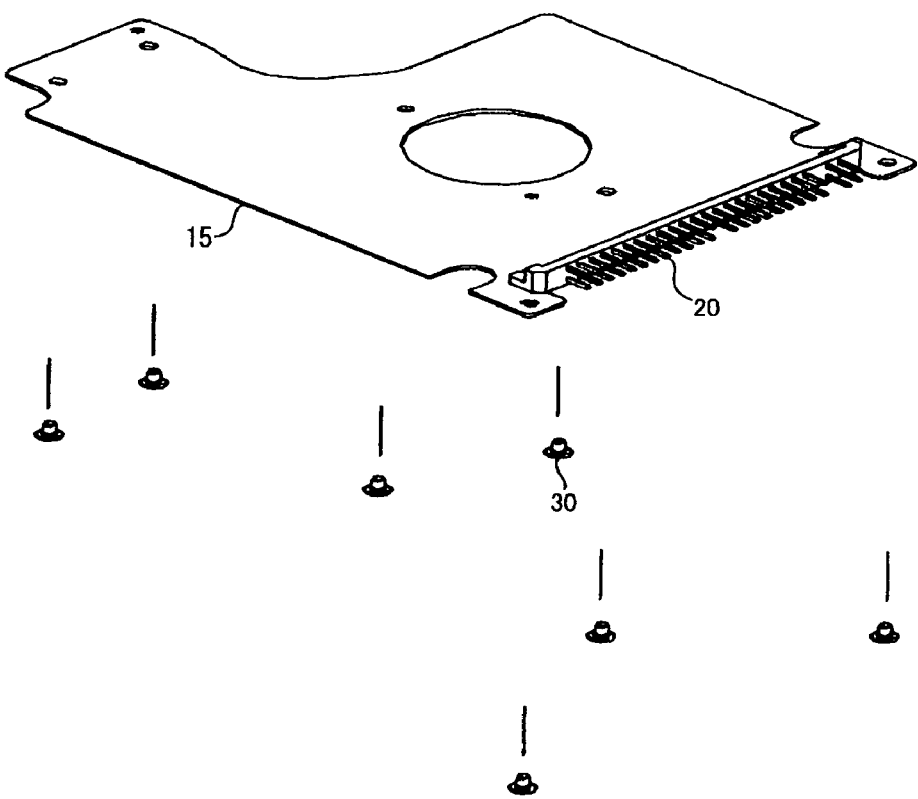
Figure 2:
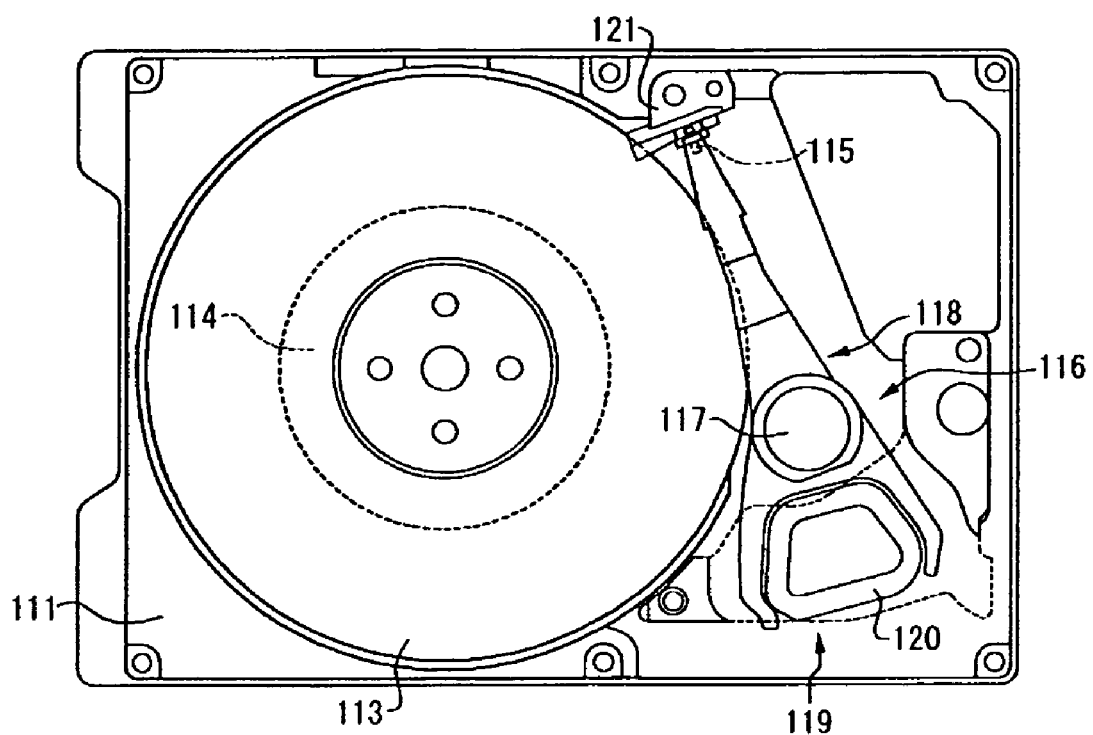
FIG. 2 is an exploded perspective view showing the construction of an HDD (hard disk drive) 1 according to an embodiment of the present invention.

FIG. 2 is a plan view showing schematically an internal arrangement of an HDD main body 11. A connector 20 fixed to a circuit board 15 (FIG. 1) is disposed on the left-hand side of FIG. 1. Referring to FIG. 2, a magnetic disk 113 is disposed in a base 111. The magnetic disk 113 serves as a nonvolatile recording medium that records data as a magnetic layer thereof is magnetized. The magnetic disk 113 is fixed to a spindle motor 114. The spindle motor 114 rotates the magnetic disk 113 at a predetermined speed. The HDD main body 11 may include a single magnetic disk 113, or a plurality of magnetic disks 113 stacked one on top of another. Typically, data is stored on both sides of the magnetic disk 113. In addition, a plurality of head sliders 115 is held by an actuator 116. Each of the head sliders 115 corresponds to each recording surface of each magnetic disk 113.

The head slider 115 includes a head and a slider. The head is secured to a surface of the slider. The head writes and/or reads data transferred to or from a host in/from the magnetic disk 113. The head includes a recording element and/or a reproducing element. The recording element converts an electric signal to a corresponding magnetic field according to the data stored in the magnetic disk 113. The reproducing element translates a magnetic field from the magnetic disk 113 to a corresponding electric signal.

The actuator 116 is rotatably held by a pivot 117. The actuator 116 includes a carriage 118 and a VCM (voice coil motor) 119. For convenience sake, the VCM 119 is shown partly cut away with an outline thereof being shown by a broken line. The VCM 119 rotates the actuator 116 about the pivot 117 according to a driving signal that is sent to a flat coil 120 from a circuit on the circuit board 15. The head slider 115 is thereby brought onto a spinning magnetic disk 113.

When the actuator 116 moves the head slider 115 radially over a surface of the magnetic disk 113, the head slider 115 can access a desired track. The head slider 115 flies above the magnetic disk 113 with a predetermined gap therefrom, when a pressure generated from viscosity of an air between an ABS (air bearing surface) of the slider opposing the S magnetic disk 113 and the spinning magnetic disk 113 balances a pressure applied by the actuator 116 toward the magnetic disk 113.

When the magnetic disk 113 is brought to a stop from a rotating state, the actuator 116 retracts the head slider 115 from above the magnetic disk 113 to a ramp mechanism 121. Another known system for retraction of the head slider is a CSS (contact start and stop) system. In CSS, the head slider 115 is retracted to a zone disposed on an inner periphery of the magnetic disk 113 at timing, at which the head does not write or read data.

FIG. 1 is an exploded perspective view showing the construction of an HDD (hard disk drive) 1 according to an embodiment of the present invention. The HDD 1 includes the HDD main body 11 and the circuit board 15 mounted on the HDD main body 11.

The HDD main body 11 accommodates various components making up the HDD 1 in an enclosure that includes the base 111 and a top cover 112. The base 111 accommodates the various components making up the HDD 1. The components making up the HDD main body 11 are housed in a hermetically sealed condition when the components are secured in position by way of the top cover 112 that closes an upper opening of the base 111 and a gasket (not shown). The base 111 and the top cover 112 are typically formed from aluminum or stainless steel.

The circuit board 15 is secured onto the side of the base 111 of the HDD main body 1. Typically, the circuit board 15 is formed of a resin such as epoxy. To enhance impact resistance of the HDD and suppress effectively the occurrence of a hardware error as a result of an external impact, the base 111 and the circuit board 15 are fixed together using a plurality of screws 30. Each of the plurality of screws 30 is passed through a through hole formed in the circuit board 15 and screwed into a threaded hole formed in an outer surface of the HDD main body 11.

The connector 20 is mounted on the circuit board 15. The connector 20 is secured to a proximal side of the circuit board 15. FIG. 1 is a view illustrating a parallel ATA connector. A connector of other protocols including a serial ATA may also be mounted depending on the applicable design. In addition, various types of circuit components (not shown) are mounted on the circuit board 15. Possible circuit components include ICs of various sorts for controlling the HDD main body 11 and data transfer between the host (not shown) and the HDD 1. More specifically, an HDC (hard disk controller)/MPU, a read/write channel, a motor driver, and other types of ICs are mounted with resistors and other elements on a surface of the circuit board 15 on the side of the HDD main body 11 (base 111).

Figure 3A:
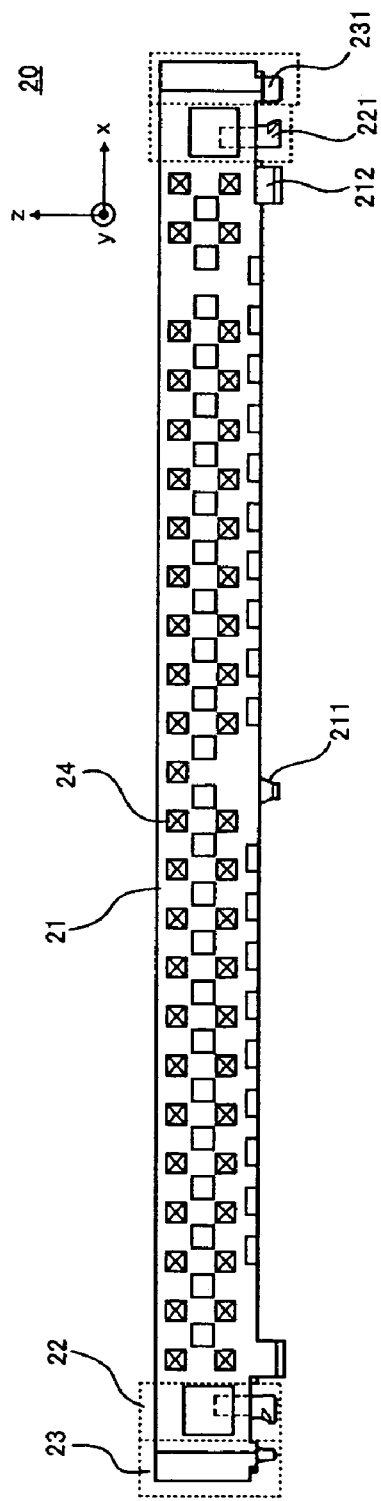
FIGS. 3(a) and 3(b) are cross-sectional views showing a connector 20 of the HDD according to an embodiment of the present invention.
Figure 3B:
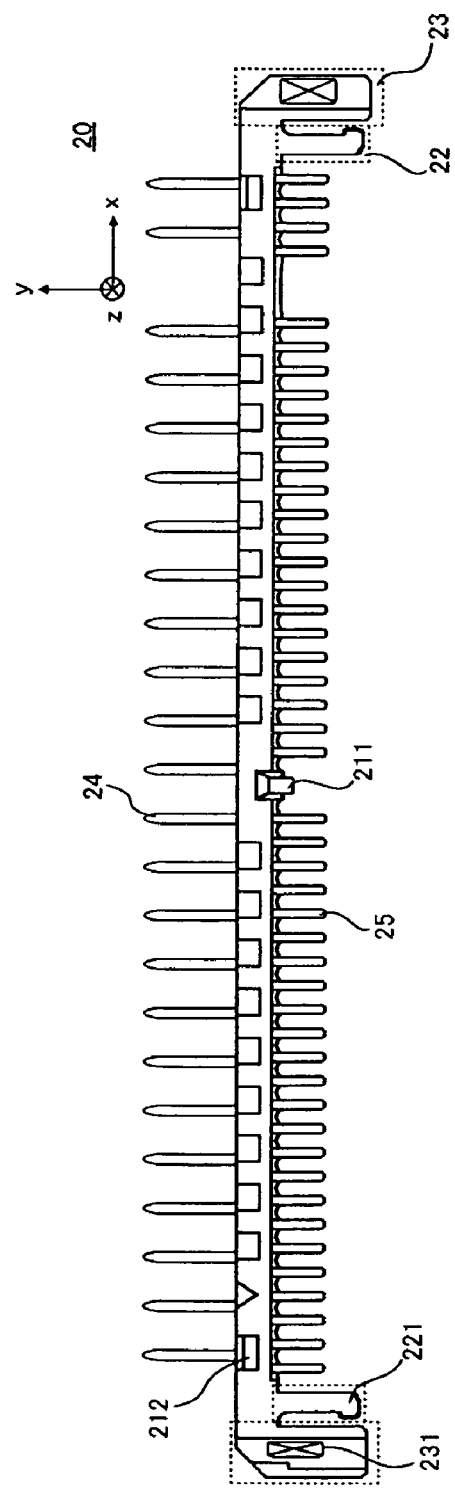
Figure 4A:
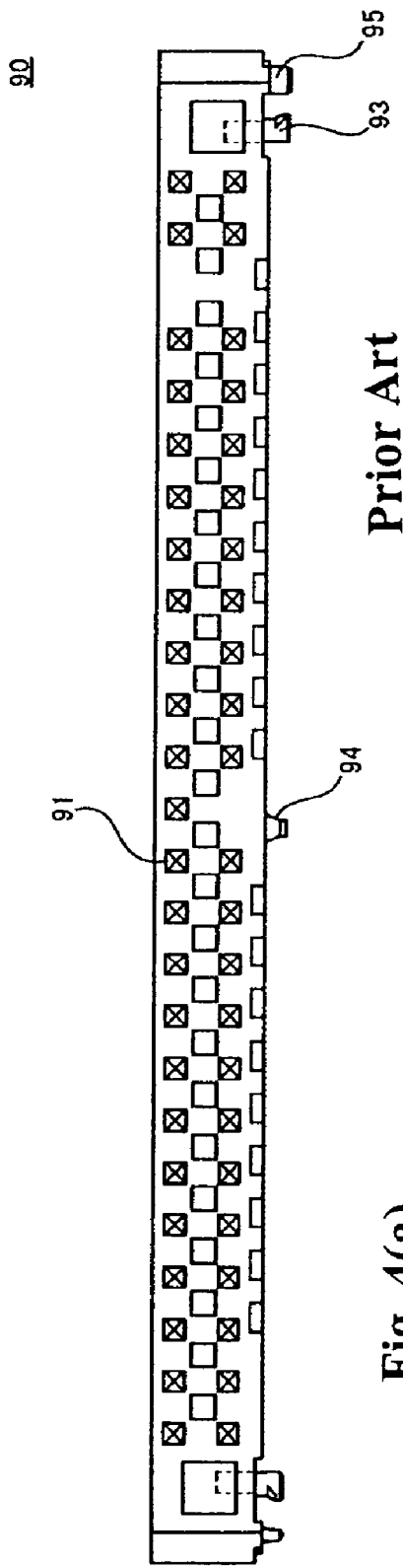
FIGS. 4(a) and 4(b) are cross-sectional views showing schematically a connector 90 of a conventional HDD.
Figure 4B:
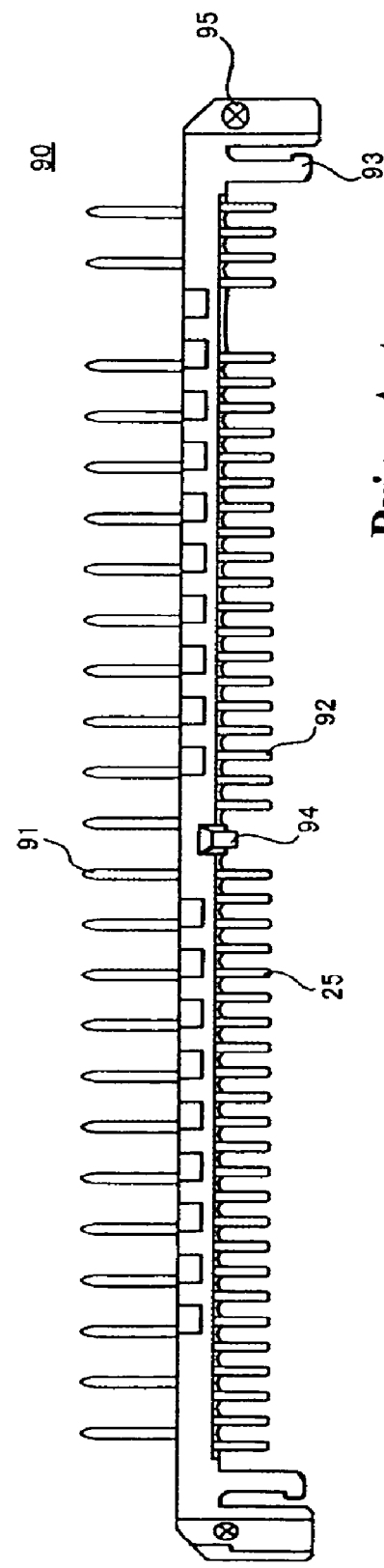

FIGS. 3(a) and 3(b) are cross-sectional views showing schematically the connector 20 of the HDD according to an embodiment of the present invention. FIG. 3(a) is a cross-sectional view showing a condition, in which the connector 20 and the circuit board 15 inside the HDD main body 11 are connected together, as viewed from a direction opposite to the circuit board 15. FIG. 3(b) is a cross-sectional view showing the connector 20 as viewed from a direction perpendicular to a longitudinal direction of the connector 20 and a protruding direction of pins 24.

Directions as they relate to the connector 20 will be defined below. The longitudinal direction of the connector 20 is the x direction. A direction that is perpendicular to the longitudinal x direction of the connector 20 and that is the protruding direction of the pins 24 disposed on the connector 20 or the protruding direction of connection terminals 25 is the y direction. The y direction represents a direction, in which the connector 20 and an interface (not shown) connected to the HDD are connected. Further, a direction that is perpendicular to both the x direction and y direction is the z direction. The z direction is perpendicular relative to a main surface of the HDD main body 11, in which the connector 20 is disposed, and a surface of the magnetic disk disposed inside the HDD main body 11. Specifically, FIG. 3(a) is a cross-sectional view as viewed from the y direction. FIG. 3(b) is a cross-sectional view as viewed from the x direction.

The connector 20 includes a plurality of pins 24 and a plurality of connection terminals 25 disposed on a base portion 21 thereof. Each of the pins 24 is connected to a corresponding one of the connection terminals 25 through soldering or the like in the base portion 21. This arrangement allows electric signals to be transferred to or from the circuit board 15 of the HDD main body 11 when the connector 20 is connected to an HDD interface. It should be noted herein that the connection terminals 25 are lined up in a row in the longitudinal x direction of the connector.

The protruding direction of the pins 24 is the y direction, which is perpendicular to the longitudinal x direction of the connector. Further, the pins 24 are disposed on an x-z plane of the connector 20. Typically, 2×25 pins are disposed as shown in FIG. 3(b), with the pins at the center and on the right-hand side of the connector 20 in FIG. 3(b) removed to ensure easy identification of the correct orientation of the connector 20 when the connector 20 is connected to the HDD interface. The arrangement of the pins 24 of the connector 20 is only typical and should not be construed to limit embodiments of the present invention.

The connector 20 is formed to include the base portion 21 and portions protruding therefrom, specifically, a first protruding portion 22 and a second protruding portion 23. There are two each provided for the first protruding portion 22 and the second protruding portion 23, disposed symmetrically about a center of the base portion 21. The first protruding portion 22 and the second protruding portion 23 are disposed on end sides from the base portion 21 on which the pins 24 are disposed. The first and second protruding portions 22, 23 protrude in a direction (y direction), in which the connection terminals 25 are disposed. The second protruding portion 23 is disposed farther on the end of the connector 20 than the first protruding portion 22.

The base portion 21 of the connector includes a latch 211 for positioning of the connector. The latch 211 is disposed on the base portion 21 of the connector so as to protrude in the z direction. The latch 211 is designed to have a thinner wall thickness in the z direction on the side of the circuit board when the circuit board 15 is connected to the connector 20. The latch 211 is thus easy to be hooked to the circuit board 15. When the circuit board 15 in the HDD main body 11 and the connector 20 are connected together, the latch 211 is aligned with a recess in the circuit board 15 for positioning in the y direction. At this time, the latch 211 is hooked onto the recess in the circuit board 15.

In addition, the condition of the circuit board 15 being hooked onto the latch 211 provides correct positioning in the z direction. Further, the latch 211 may be disposed at the center of the base portion 21 in the x direction. This is because of the following reason. Specifically, the latch 211 being located at the center in the x direction of the base portion 21 during positioning allows the position of the connector 20 relative to the circuit board 15 inside the HDD main body 11 in the y and z directions to be reliably defined.

In addition, the first protruding portion 22 includes a positioning protrusion 221 for defining the position of the connector 20 relative to the circuit board 15 inside the HDD main body 11. When the circuit board 15 inside the HDD main body 11 is connected to the connector 20, the positioning protrusion 221 fits into a hole made in the circuit board 15. This correctly positions the connector 20 relative to the circuit board 15. At this time, the condition, in which the positioning protrusion 221 fits into the hole in the circuit board 15, results in the connector 20 being positioned in the z direction relative to the circuit board 15. Further, the positioning protrusion 221 may be disposed at a position offset from the latch 211 in the y direction. This arrangement allows positioning in the y direction to be achieved, in addition to positioning in the x and z directions.

The connector 20 of the HDD according to an embodiment of the present invention includes a stopper 212 disposed on the base portion 21 thereof. The stopper 212 prevents the connection, soldered or otherwise joined, between the connector 20 and the circuit board 15 from being destroyed by a force applied to the connector 20 when the connection is made with the connector 20 or when the HDD is dropped.

The stopper 212 is a protrusion formed on the base portion 21 of the connector. When a force is applied to the connector 20 during connection of the connector 20 or when the HDD is dropped, the stopper 212 is abutted against an end portion on the side of the circuit board 15, on which the pins 24 of the connector 20 are disposed. The aforementioned force can thereby be counteracted. This reduces the possibility of the connection between the connector 20 and the circuit board 15 being destroyed.

There are two stoppers 212, each being disposed on either end across the center of the connector 20 in the x direction. It should be noted herein that the more the number of stoppers 212, the more the force applied to the connector 20 is dispersed. Accordingly, the number of stoppers 212 may be large to the extent that the strength of the base portion 21 of the connector is maintained. Referring to FIGS. 3(a) and 3(b), the stoppers 212 are disposed at the remotest end portions of the pins 24 disposed on the base portion 21 of the connector. The force is not always evenly applied in the y direction during disconnection and connection of the connector 20. The force can at times be applied locally. Stoppers 212 may be disposed at least at the remotest end portions of the pins on the base portion 21 of the connector.

The stopper 212 has a length in the x direction longer than a length in the y direction. This arrangement is made for the following reason. Specifically, when a force is applied to the connector 20 causing the stoppers 212 to be abutted against the circuit board 15 and when resultant force acting on the stoppers 212 is then counteracted, the counteracting force can be made greater with larger areas of abutment.

Stopper 212 may further have a thickness in the z direction that is thicker than a thickness of a portion of the circuit board 15 connected to the connector 20, against which the stopper 212 abuts when the force is applied to the connector 20. If the stopper 212 has an insufficient thickness, a large force is applied to the connector 20 causing the circuit board 15 to ride over the stopper 212. The stopper 212 can then no longer perform its intended function.

Stoppers 212 may be disposed symmetrically about the center of the base portion 21 in the x direction. This is because of the following reason. Specifically, it is highly likely that not only the force applied to the connector 20 will act evenly in the y direction but also a strong force will act partially in the x direction. The foregoing arrangement can respond to these cases.

Stoppers 212 may further be disposed in a direction in which the pins 24 are disposed in the y direction relative to the latch 211. This is because of the following reason. Specifically, in an ordinary state in which a large force is not applied to the connector 20, the stoppers 212 do not need to be in abutment with the circuit board 15; the stoppers 212 need to abut against the circuit board 15 only if a large force is applied. Specifically, it is not necessary to form receivers of the stoppers 212 on the side of the circuit board 15. This helps make the forming of substrates easy.

The foregoing arrangement of the stoppers 212 provided for the connector 20 helps reduce the possibility that the connection between the connector 20 and the circuit board 15 will be destroyed by the force applied to the connector 20 during connection of the connector 20 or when the HDD is dropped.

The connector 20 of the HDD according to an embodiment of the present invention includes a boss 231 disposed at the second protruding portion 23. The boss 231 prevents the connection, soldered or otherwise joined, between the connector 20 and the circuit board 15 from being destroyed by a force applied to the connector 20 when the connection is made with the connector 20 or when the HDD is dropped. Each of the second protruding portions 23 disposed on both sides across the center of the base portion 21 in the x direction includes one boss 231. In FIGS. 3(a) and (b), the boss 231 is disposed on the side of the second protruding portion 23, on which the pins 24 are disposed.

The boss 231 is a protrusion of an oblong form having a length in the y direction longer than a length in the x direction. It is to be noted herein that the shape of the bosses 231 on both sides across the center of the base portion 21 in the x direction does not have to be identical. In FIGS. 3(a) and (b), the boss 231 on the left-hand side in FIG. 3(b) is slenderer than the boss 231 on the right-hand side in FIG. 3(b) for a reason of strength of the second protruding portion 23. Boss 231 may have a shape longer in length in the y direction as much as possible to the extent that the strength of the second protruding portion 23 can be maintained.

The circuit board 15 includes a hole made therein to correspond to the boss 231. It is arranged so that the boss 231 fits into this hole when the connector 20 is connected to the circuit board 15. If a large force is applied to the connector 20 when the connection is made with the connector 20 or when the HDD is dropped, the boss 231 becomes unable to move in the hole in the circuit board 15. The large force can thereby be counteracted. Furthermore, a force applied to the connector 20 comes from the y direction or x and y directions. In these cases, it is considered that the force in the y direction is greater. Therefore, the boss 231 has the oblong form having a length in the y direction longer than the length in the x direction.

Bosses 231 may be disposed on the ends of the connector 20 outer than the latch 211 and the positioning protrusions 221. This is because of the following reason. Specifically, assume conditions, in which the bosses 231 are disposed closer to the latch 211 or disposed toward the center of the connector main body in the x direction than the positioning protrusions 221 are disposed. If a large force is applied to parts on the ends of the connector 20 in this condition, the force is applied to the stoppers 212 and bosses 231 and a central part in the x direction can counteract the force; however, end portions are unable to counteract the force applied to the connector 20. This results in broken end portions, which could lead to destroyed connection between the circuit board 15 and the connector 20.

The bosses 231 included in the connector 20 help reduce possibility that the connection between the connector 20 and the circuit board 15 will be destroyed by the force applied to the connector 20 during connection of the connector 20 or when the HDD is dropped.

In order to counteract the force applied to the connector 20, boss 231 and the stopper 212 may be disposed near the positioning protrusion 221 disposed in the first protruding portion 22. This is because of the following reason. Specifically, the first protruding portion 22 defines the positional relation between the circuit board 15 and the connector 20; the boss 231 and the stopper 212 can both counteract the force applied to the connector 20. This significantly reduces the possibility of the connection between the connector 20 and the circuit board 15 being destroyed.

In the connector 20 of the HDD according to an embodiment of the present invention, providing the stopper 212, the boss 231, or both of them allows the connector 20 to counteract a force, even though a large force is applied to the connector 20 when the connector 20 is connected or the HDD is dropped. Accordingly, it is possible to provide an HDD connector having a sufficient strength capable of significantly reducing the possibility of the connection between the connector 20 and the circuit board 15 being destroyed.

The present invention is not limited to the aforementioned embodiment and can be implemented in various manners without departing from the spirit thereof. For instance, though the connector includes the positioning latch according to an embodiment of the present invention, the present invention is also applicable to an HDD, in which it is not practical to provide a latch. While the present invention has been described in only one of its forms applied to the HDD, it should be understood that the present invention can be applied to other types of devices in addition to the HDD.

What is claimed is:

1. A data storage device including a circuit board and a connector mounted on a mounting surface of the circuit board, the connector comprising:
   a connection terminal connected to the circuit board;
   a connector base portion holding the connection terminal;
   a boss disposed on each of both sides of the bottom of the connector base portion across a center thereof in a direction perpendicular to a normal direction of the mounting surface of the circuit board; and
   a stopper protruding in the normal direction, the stopper disposed on a side opposite to the circuit board relative to an end portion of the circuit board in the connection direction;
   wherein each of the bosses protrudes in the normal direction and fits vertically into a hole formed in the circuit board; and
   wherein each of the bosses have a length in a connection direction of the connector with an interface that is longer than a length in the direction perpendicular to the normal direction and the connection direction.

2. The data storage device according to claim 1, wherein the boss has curved surfaces on end faces on both sides in the connection direction.

3. The data storage device according to claim 1, wherein the boss is disposed at a point closer to a board end than the connection terminal in a direction extending in parallel with the mounting surface and perpendicular to the connection direction.

4. The data storage device according to claim 1, wherein the connector includes a protrusion for defining a positional relation relative to the connector by being fitted into the hole formed in the circuit board.

5. The data storage device according to claim 1, wherein the bosses are disposed at positions symmetrical about the center of the connector base portion in the direction extending in parallel with the circuit board surface and perpendicular to the connection direction.

6. The data storage device according to claim 1, wherein the connector main body portion includes a latch for defining a positional relation between the circuit board and the connector.

7. The data storage device according to claim 6, wherein the latch is disposed at a center of the connector base portion in a direction extending in parallel with a circuit board surface and perpendicular to the connection direction.

8. The data storage device according to claim 4, wherein the connector main body portion further includes a latch for defining a positional relation between the circuit board and the connector; and
   wherein the protrusion is disposed at a position offset from the latch in the connection direction.

9. A connector for mounting on a mounting surface of a circuit board, the connector comprising:
   a boss protruding in a normal direction of the mounting surface to fit vertically into a hole formed in the circuit board, the boss having a length in a connection direction of the connector longer than a length in a direction perpendicular to the normal direction and the connection direction; and
   a stopper protruding in the normal direction, the stopper disposed on a side opposite to the circuit board relative to an end portion of the circuit board in the connection direction;
   wherein the boss and the stopper are each disposed on both sides across a center of a connector main body portion in a direction perpendicular to the normal direction of the mounting surface and the connection direction of the connector;
   wherein the boss and stopper are each configured to counteract a horizontal force.

* * * * *